US006713109B1

(12) United States Patent
Lassota

(10) Patent No.: US 6,713,109 B1
(45) Date of Patent: Mar. 30, 2004

(54) METHOD OF TEA EXTRACTION

(75) Inventor: Zbigniew G. Lassota, Long Grove, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 10/352,575

(22) Filed: Jan. 28, 2003

Related U.S. Application Data

(60) Continuation-in-part of application No. 09/697,849, filed on Oct. 27, 2000, now Pat. No. 6,576,282, which is a division of application No. 09/438,094, filed on Nov. 10, 1999, now Pat. No. 6,571,685, which is a division of application No. 09/131,992, filed on Aug. 11, 1998, now Pat. No. 6,148,717.

(51) Int. Cl.[7] .................................................. A23F 3/34
(52) U.S. Cl. ....................................... 426/435; 426/597
(58) Field of Search ................................. 426/597, 594, 426/433, 435

(56) References Cited

U.S. PATENT DOCUMENTS 4,550,027 A * 10/1985 Stone, Jr.
5,647,055 A * 7/1997 Knepler
6,095,031 A * 8/2000 Warne

* cited by examiner

Primary Examiner—Anthony Weier
(74) Attorney, Agent, or Firm—James W. Potthast; Potthast & Associates

(57) ABSTRACT

A method of making tea with a tea maker (54) provided with a control system (116) that enables the tea to be intermittently drained of water to allow contact of the tea (52,26) with atmospheric oxygen several times during each brew cycle to enhance flavor and to eliminate the problems associated with seeping of the tea.

15 Claims, 10 Drawing Sheets

METHOD OF TEA EXTRACTION

CROSS REFERENCE TO RELATED APPLICATIONS

This application is a division of and claims the benefit under 35USC120 of U.S. patent application Ser. No. 09/438,094, filed Nov. 10, 1999, now U.S. Pat. No. 6,571,685 of the present inventor and entitled "Oxygenating Tea Maker and Method" and is a continuation-in-part of and claims the benefit under 35USC120 of U.S. patent Ser. No. 09/697,849 filed Oct. 27, 2000,now U.S. Pat. No. 6,576,282 which is a division of U.S. patent application Ser. No. 09/131,992 filed Aug. 11,1998, now patent number U.S. Pat. No. 6,148,717.

BACKGROUND OF THE INVENTION

1. Field of the Invention

This invention generally relates to tea making and a method of extracting liquid tea from tea leaves using an automated tea maker.

2. Discussion of the Prior Art

There are two types of commercial tea makers: tea leaf makers that use tea leaves that are placed atop an open filter paper at the bottom of a brew basket and ground tea makers that use ground tea contained in preselected closed filter envelopes that are placed in the bottom of the brew basket. In the case of the tea leaves, the tea leaves come in preselected amounts that are sealed in plastic packages to keep the tea leaves fresh until use. When it is time to use the tea leaves, a fresh cup-shaped filter paper is placed into a brew basket, the plastic package is opened and the tea leaves are dumped onto the bottom of the filter at the bottom of the brew basket. In the case of the ground tea makers, there is no need for a separate filter for the brew basket because the ground tea is already contained within an envelope made of filter paper. When it is time to use the ground tea, the envelope with the ground tea is simply placed into the bottom of the brew basket by itself In both types of tea makers, after the dry tea ingredient has been located in the bottom of the brew basket, hot water is added into the open top of the brew basket at a sufficient rate compared to the liquid output rate of tea extract draining from the drain hole at the bottom of the brew basket to completely submerge the tea and to maintain the tea ingredient submerged for several minutes. As seen if FIG. 1, the brew basket 18 of a PRIOR ART tea maker has an open top 20, a small drain opening 22 and has an insert 24 within which is fitted a correspondingly shaped filter bag, or ground tea envelope, 26 made of filter paper and containing two ounces of ground tea. The known tea makers quickly add hot brew water 28 into the open top 20 to a level 30 that is well above the level of the tea in the filter bag 26. After all of the tea is submerged the known tea makers continue to add hot brew water as the tea extract slowly drains from the drain hole 22 to keep the tea submerged for several minutes.

A snug fit between the filter envelope 26 and the insert 24 within which it is nestled is designed to prevent the tea envelope from rising to the surface of the water 28. The diameter of the drain hole 22 is only approximately 0.115 inch to provide a relatively slow drain to enable the hot brew water to quickly accumulate within the brew basket and rise to the maximum level 30. After the hot brew water has reached the top level 30, the tea remains submerged while the extract slowly drains from the drain hole 22 over a period of several minutes.

Because the brew basket must contain at one time a substantial portion of the total hot brew water that is used, approximately seventy to eighty ounces per 1-½ gallon of tea to be made, the brew basket must have a relatively large capacity and a relatively high profile. It is believed that all known commercial makers operate on the basis of steeping the tea in order to obtain the liquid tea extract.

After the teas is extracted, the liquid tea extract is passed into a dispensing or serving urn in which it is diluted with an amount of mixing water equal to make 1-½ gallons, 3 gallons and 4-½ gallons of tea. Generally, two ounces of tea are used for each 1-½ gallons of tea to be made. Cold mixing water is used to dilute the tea extract to make ice tea and hot mixing water is added to the extract to make hot tea.

A problem with the ground tea makers is that when the hot water is first added to the brew basket the air inside of the envelope heats and expands. This causes the envelope to expand and consequently to float on top of the hot water. When floating on top of the water the tea inside the envelope does not properly steep and the steeping water can exit the brew basket without passing through the tea envelope. Accordingly, filter baskets have been provided with inserts 24 that are designed to hold the envelope 26 down within the brew basket in a position directly above the drain hole 22. In this position at the bottom of the brew basket the envelope 26 and the tea contained within is kept submerged during steeping. Most but not all the water passes through the envelope to exit from the drain hole.

Disadvantageously, different sized (two ounces and four ounces) and different shaped (square, rectangular and round) commercial tea envelopes and the use of multiple envelopes for a single brew requires the use of different sized and different shaped inserts or different brew baskets with integrated inserts to hold the different envelopes in proper steeping position within the brew basket.

In the case of the tea leaves in an open filter, the tea leaves at first float on the surface of the hot water but then quickly saturate and sink into the water and steep and do not suffer from this problem. However, because of the need to accumulate hot water in the brew basket for several minutes, it is necessary to keep the drain hole 22 relatively small. Consequently, it is not uncommon for the tea leaves after wetted to collapse the filter paper to create a blockage over the drain hole 22 that interferes with proper draining.

The tea envelopes of ground tea are generally preferred over loose tea leaves because of the ease of use of the ground tea envelopes compared to the packages of loose tea leaves. If greater quantities of tea arc desired, then more two ounce envelopes 26 are added into the brew basket 18. The need for a separate filter paper required by the loose tea bags is eliminated, and thus the associated separate steps of inserting and removing the separate filter are eliminated. The closed filter envelopes 26 eliminate spillage, and the separate steps of opening the plastic package, dumping of the tea into the open filter and the disposal of the empty plastic package are also eliminated.

It has been determined that increased amounts of oxygen in the hot brew water during steeping improves the quality of the tea extract with respect to potency and flavor of the final tea product.

SUMMARY OF THE INVENTION

In accordance with the tea making method of the present invention, the need for using different sized inserts or brew baskets to brew tea from different sized or shaped tea envelopes is eliminated and increased free oxygen is put into contact with the tea during the extraction process by eliminating the process of steeping.

This objective is achieved in part by providing a method of brewing tea in an automatic tea maker having a supply of hot brew water, a controlled valve for passing the hot brew water into a brew basket, a supply of mixing water, and a dispensing urn for receipt of tea extract and receipt of mixing water from the mixing water supply, coposed of the steps of establishing with a timer of a controller a brew cycle, said brew cycle being composed of a plural succession of extraction cycles, each extraction cycle alternating between an intermittent add period of preselected duration and an intermittent pause period of preselected duration, placing dry tea ingredient at the bottom of the brew basket, opening the controlled valve during each add period to add hot water from the hot brew water supply to the tea at the bottom of the brew basket, and closing the controlled valve during each of the intermittent pause periods to allow the hot brew later added during the add period to drain sufficiently through the tea and out of the drain hole as tea extract to expose to atmospheric air the tea within the brew basket before the commencement of the next add period, and draining from the brew basket through a drain hole of sufficient size substantially all of the tea extract during each pause period.

Preferably, each of the extraction cycles has a period duration on the order of thirty seconds, and each of the add periods is on the order of approximately seven to ten seconds in duration. The method also may include the steps of preselecting the duration of the add periods for a given brew cycle to be one of a period on the order of an approximately seven seconds and a period on the order of approximately ten seconds.

In accordance with one aspect of the method of the invention, an amount of hot water on the order of approximately 6.33–7.6 ounces of hot brew water is added to the brew basket during an add period on the order of 7–10 seconds during each intermittent add period, and the drain hole has a minimum diameter on the order of approximately 0.285 inch. Generally, the duration of the brew cycle is on the order of approximately 5–6 minutes, the extraction cycle is approximately thirty seconds, the add period is approximately seven to ten seconds and the amount of hot brew water added to the brew basket during each add period is approximately 6.33–7.6 ounces.

The objective is also achieved by a method of making tea in an automatic tea maker having a supply of hot brew water, a controlled valve for passing the hot brew water into a brew basket, a supply of mixing water, and a dispensing urn for receipt of tea extract and receipt of mixing water from the mixing water supply, by performing the steps of placing a preselected amount of tea within the brew basket, during a brew cycle automatically passing a preselected quantity of hot brew water into the brew basket and into contact with the tea at the bottom of the brew basket at a preselected brew water passing rate, and draining tea extract from the brew basket at a preselected drain rate relative to the preselected brew water passing rate to prevent the tea from continuously steeping in its entirety in the hot water for the entire brew cycle and to thereby expose the tea to atmospheric air including oxygen during a significant portion of the brew cycle.

Preferably, the step of automatically passing includes the step of intermittently changing the relationship between the passing rate and the drain rate to allow a substantial portion of all of the tea extract to be drained from the brew basket repetitively throughout the brew cycle. The actual rate of passing during intermittent periods, when there is no pausing in the actual passing, is preferably greater than the drain rate, preferably approximately 3–4 times the drain rate.

In the preferred embodiment, the average passing rate during the brew cycle is composed of a plurality of successive periods of different actual rates that vary substantially above and below the average rate and the drain rate is continuous, and included is the step of intermittently changing the relationship between the passing rate and the drain rate to allow a substantial contact of the tea with the atmospheric oxygen during the brew cycle.

BRIEF DESCRIPTION OF THE DRAWINGS

The foregoing advantageous features of the tea maker and tea making method of the present invention will be described in detail and other advantageous features will be made apparent from the detailed description that is given with reference to the several figures of the drawing, in which.

DETAILED DESCRIPTION

Figure 1:
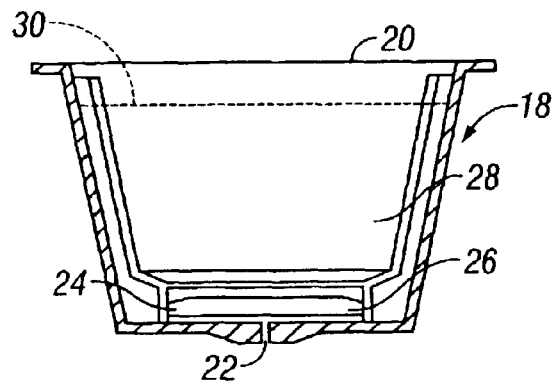
FIG. 1 is a schematic cross-sectional side view of a PRIOR ART brew basket with a tea envelope being held at the bottom and over the drain hole and completely submerged by means of an insert all as described above.
Figure 2:
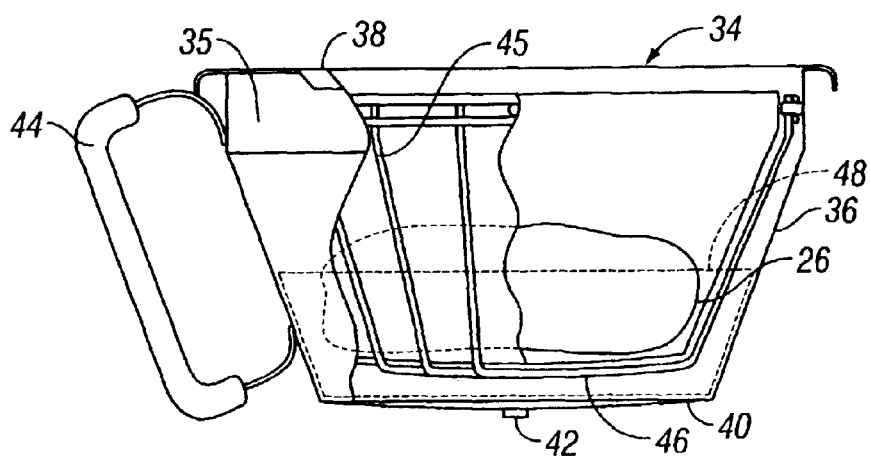
FIG. 2 is a side elevation view of the brew basket of the tea maker of the present invention with portions broken away to illustrate the height of the hot brew water relative to the filter bag or loose tea leaves on the bottom of the brew basket.

Referring now to FIG. 2, the brew basket 34 of the present invention is seen to include an outer, generally cup-shaped body 35 with a solid sidewall 36 surrounding an open top 38 and having a relatively flat bottom 40 that slightly slopes downwardly to a relatively large drain hole 42. A handle 44 is attached to the sidewall 36, and a wire filter basket 45 is removably mounted within the sidewall 36 with a generally flat bottom 46 that is elevated above the bottom 40 of the outer body 35. As seen, unlike the prior art brew basket 18 of FIG. 1 that is used for steeping the tea, the wire basket 45 does not have a special insert to hold the tea envelope 26. Instead, the envelope simply rests upon the relatively flat bottom 40 of the wire basket and does not float because the water level 48 is kept relatively low so as to prevent floatation and to enable oxygenation of the tea within the envelope 26. In addition, because there is not seeping there is no need for the brew basket 34 of FIG. 2 to have a large volume capacity. The brew basket 34 only needs capacity to hold approximately several ounces of brew water at a time and the tea envelope or envelopes. Accordingly, the brew basket 34 is advantageously provided with a relatively low profile. Moreover, because there is no seeping required, the drain hole 42 has a relatively large diameter of approximately 0.285 inch that is almost two and one half times larger than the drain hole 22 of the prior art basket to eliminate clogging by tea leaves or collapsing filter paper.

Figure 3:
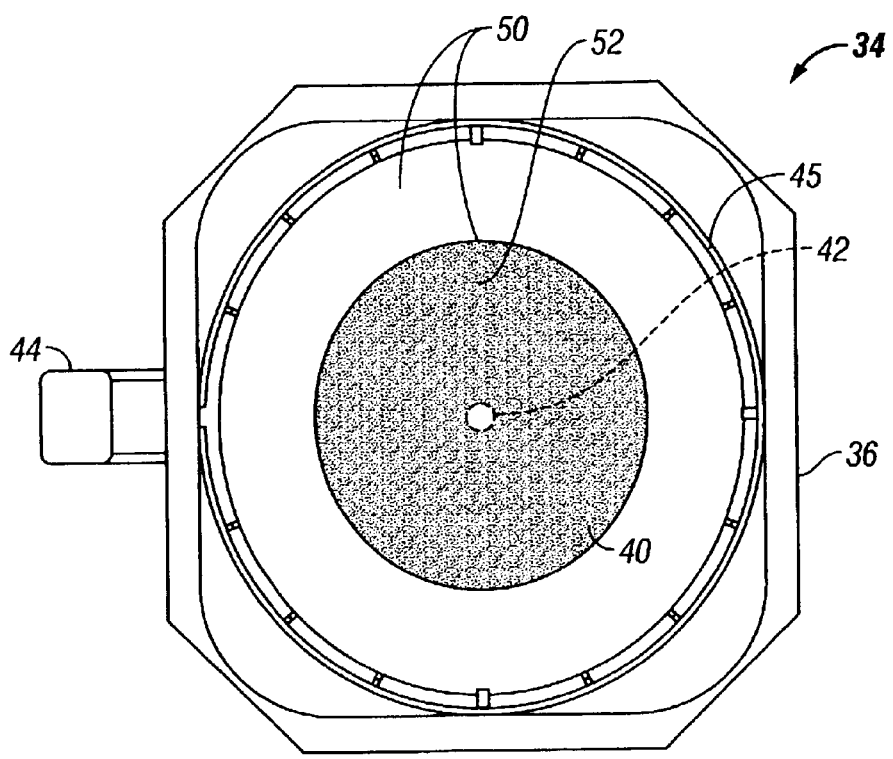
FIG. 3 is a top view of the brew basket of FIG. 2.

As shown in FIG. 3, because there is no insert in the wire basket 45 for holding down the tea envelope 26, the brew basket 34 can also be used with a separate open filter 50 containing tea leaves 52 spread over the relatively flat bottom 46 of the wire basket. Advantageously, the same brew basket 34 is therefore suitable for use with filter bags 26 of different shapes and sizes by simply laying the filter bags on the flat bottom as well as with loose tea 52 placed on the bottom of a separate piece of filter paper supported by the flat bottom 46. The wire filter basket 45 has a circular configuration while the body 35 has a generally squared or octagonal configuration to present a flat flush appearance when mounted to the tea maker of the present invention.

Figure 4A:
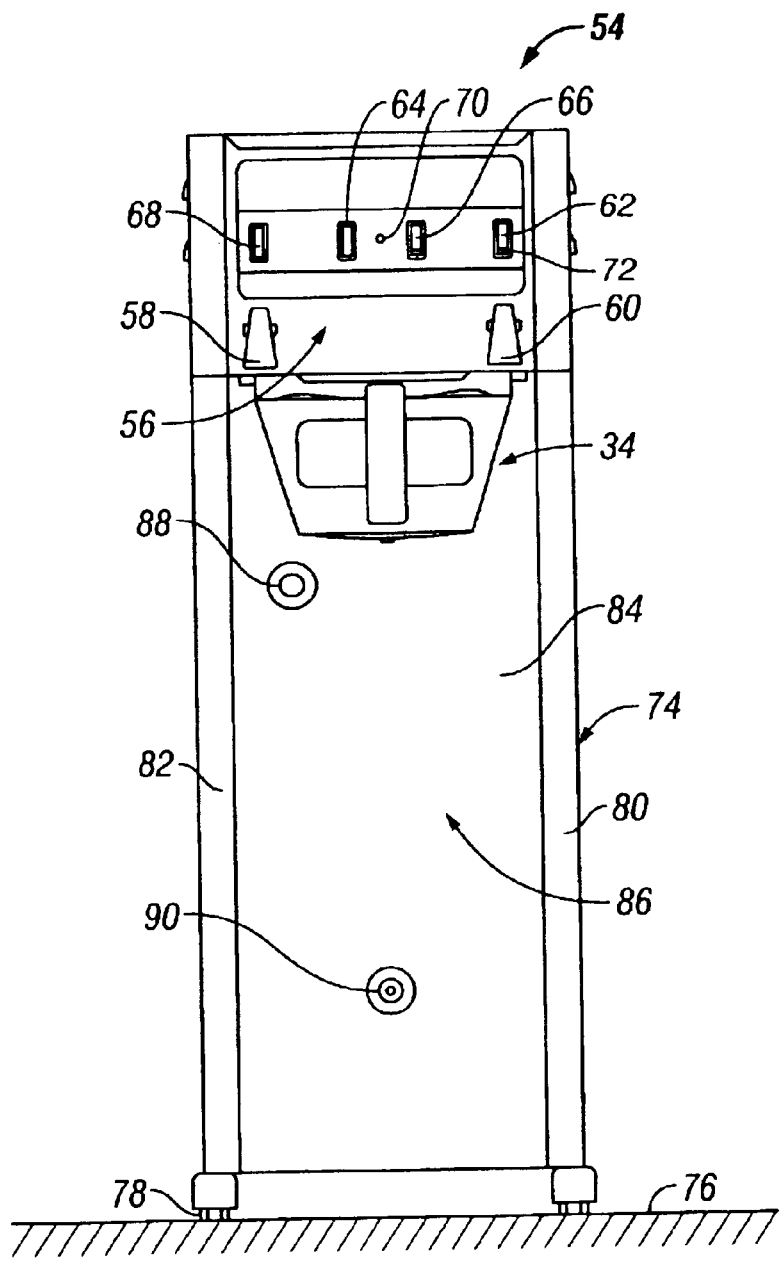
FIG. 4A is a front elevation view of the preferred embodiment of the tea maker of the present invention without the tea dispensing urn in place for receipt of extract and mixing water.

Referring now to FIG. 4A, the preferred embodiment of the oxygenating tea brewer 54 of the present invention has a an elongate body with a box-like upper housing 56 to which manual control switches and status indicator lights and are mounted as well as a dark tea faucet 58 and a green tea faucet 60. The manual control switches include a power switch 62, a start brew cycle switch 64 and a stop brew cycle switch 66. The indicator lights includes a ready light 68, a brew light 70 and a power on back light 72 associated with the power switch. Removably supported beneath the upper housing 56 is the brew basket 34 of FIGS. 2 and 3. The upper housing 56 is supported atop a lower housing 74 that, in turn, is supported upon a suitable flat surface 76 by feet 78, preferably rollers. Two sidewalls 80 and 82 extend from a back 84 in spaced parallel relationship to provide a docking space 86 beneath the brew basket 34 for receipt of a dispensing urn that will be described with reference to FIG. 4B. A dilution, or mixing, water spout 88 is mounted to and extends forwardly from the back 84 for sliding receipt within the interior of the dispensing urn when it is mounted within the docking space 86. An urn detection switch 90 is mounted to the back 84 to sense when the dispensing urn is fully inserted into the docking space 86. In the absence of detection of the urn, the brewer is disabled from brewing any tea.

Figure 4B:
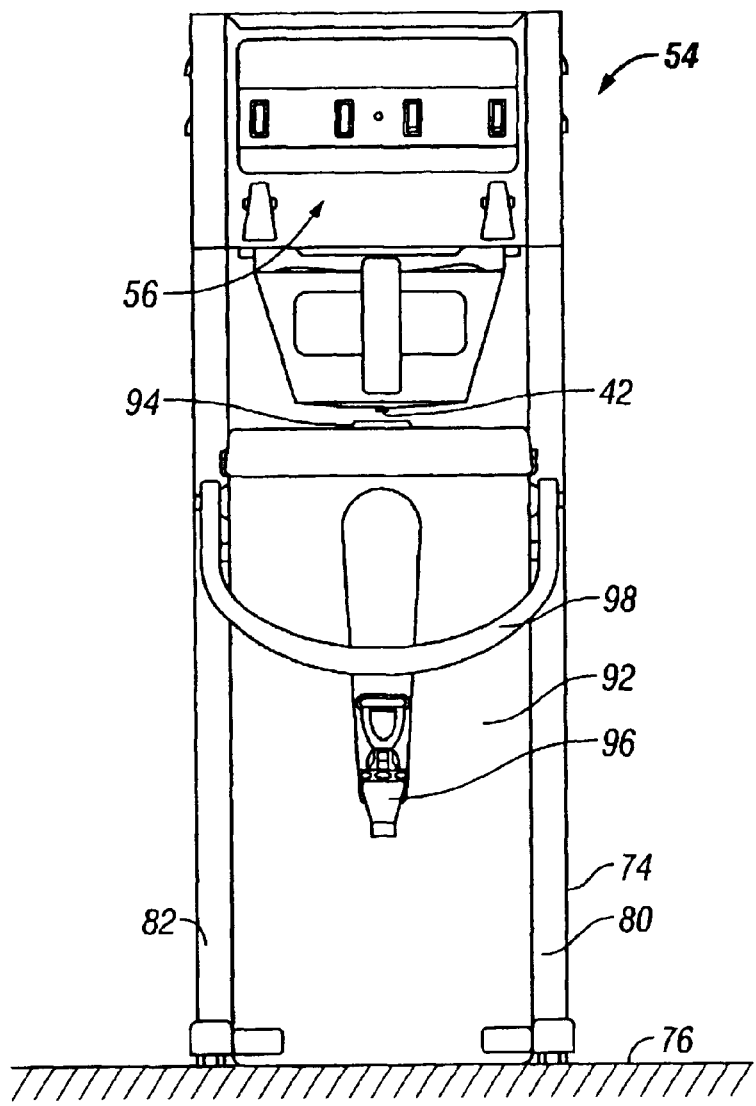
FIG. 4B is a front elevation view that is the same as that of FIG. 4A but with the tea dispensing urn in place beneath the brew basket for receipt of tea extract and in position to receive mixing water.

Referring to FIG. 4B, the dispensing urn 92 is supported on the support surface 76 within the docking space 86 with an open inlet 94 aligned directly beneath the drain hole to receive the tea extract and with a dilution water inlet in the back (not shown) within which is received the dilution water spout 88 for receipt of the dilution water. The urn has a serving faucet 96 and a handle 98 to facilitate moving it to a serving location after it is filled with, freshly brewed tea.

Figure 4C:
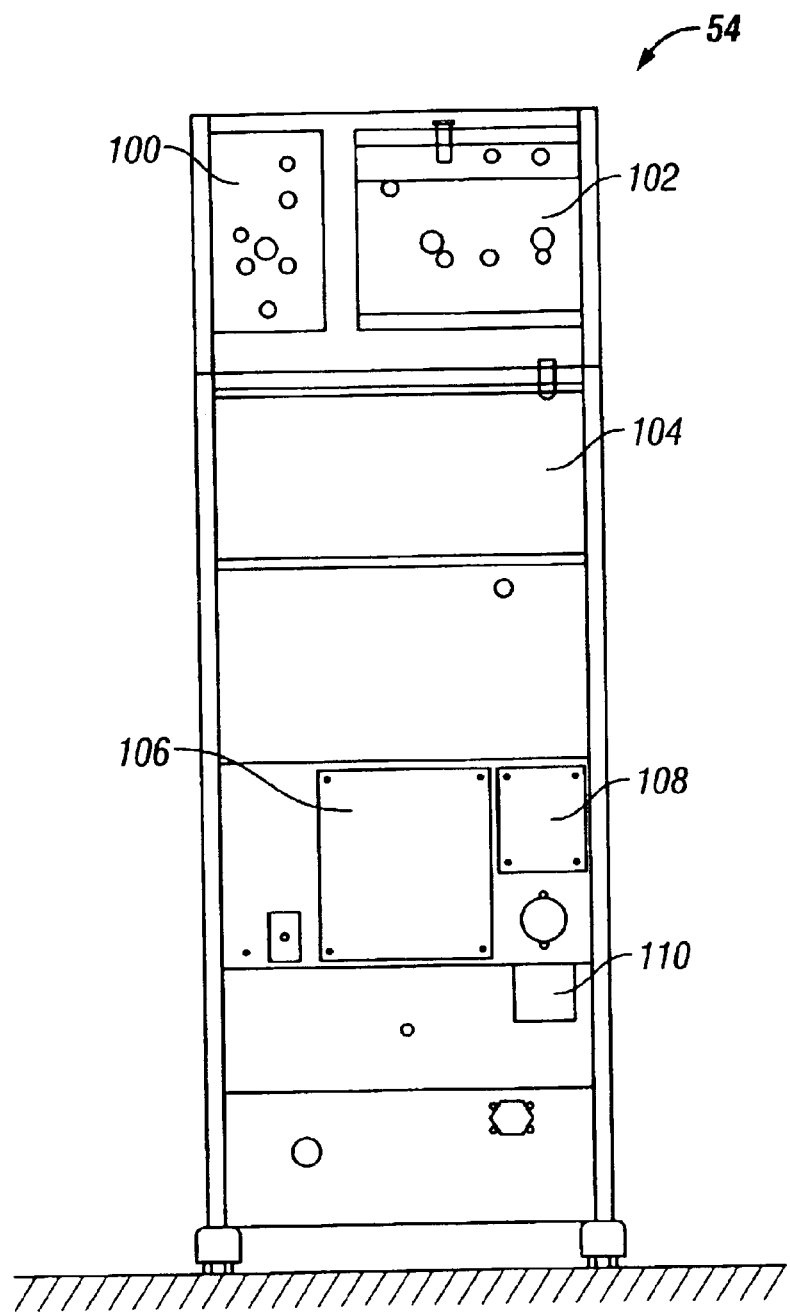
FIG. 4C is a back elevation view of the tea maker of FIGS. 4A and 4B.
Figure 4D:
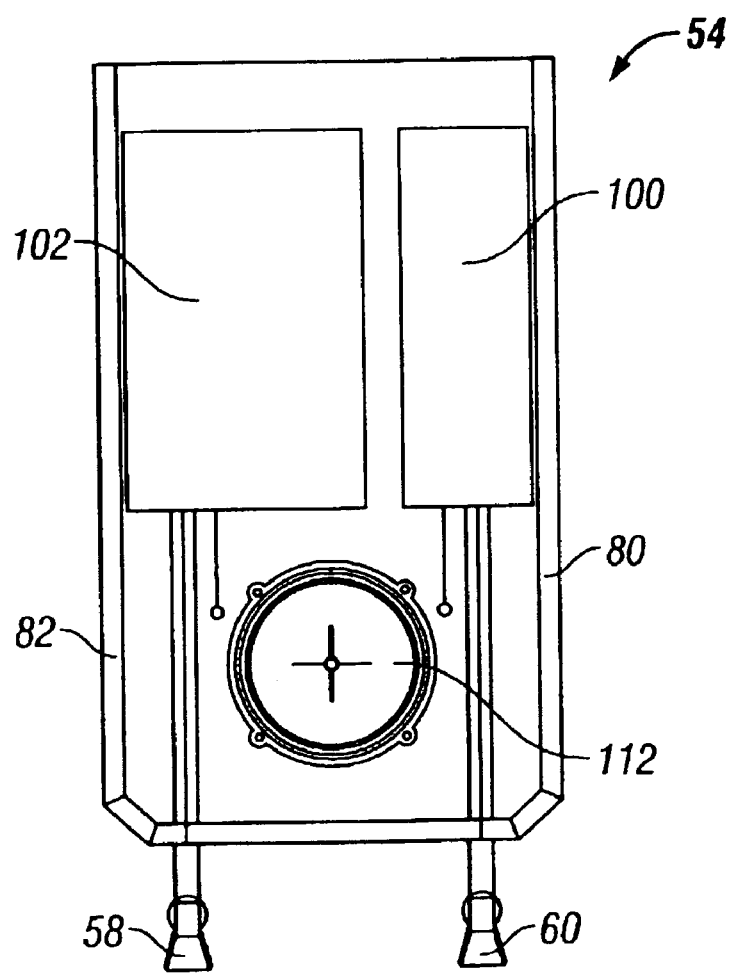
FIG. 4D is a plan view of the tea maker of FIGS. 4A, 4B and 4B.

Referring to FIG. 4C, a number of other components of the tea maker 54 are seen from the back of the tea maker 54. Mounted within the upper housing 56 is a green tea tank 100 and a hot brew water tank 102. At the top of the lower housing 74 is the mixing or dilution water tank 104 that in the case of making ice tea contains cold or unheated water. A circuit board 106 and an LLC board 108 that carry various circuit components for controlling the tea maker 54 are mounted beneath the dilution tank 104. A thermostat 110 is also mounted at this location. The tanks 100 and 102 are also seen in the plan view of FIG. 4D. In addition, shown is a spray assembly 112 located above the brew basket location to spray hot brew water onto the tea at the bottom of the basket.

Figure 5:
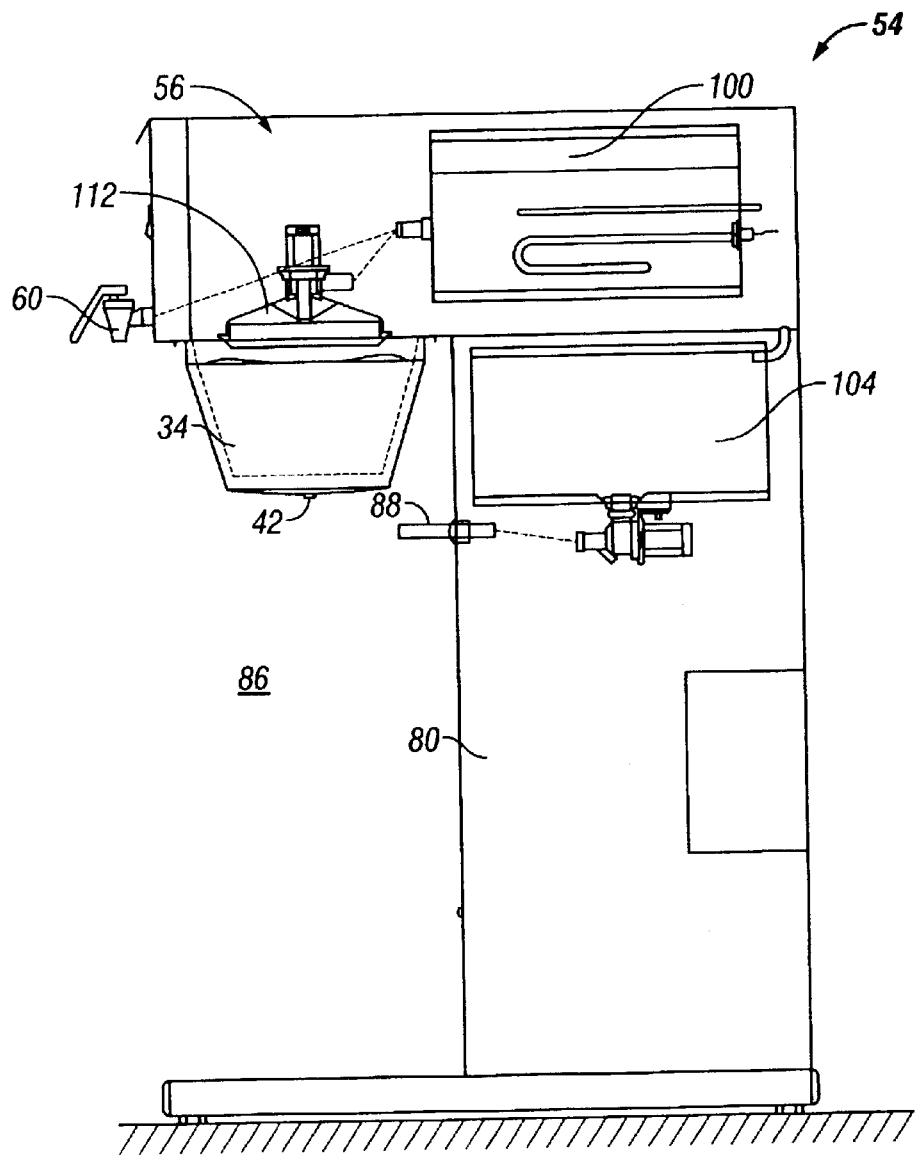
FIG. 5 is a schematic sectional side view of the tea maker of FIGS. 4A–4D.

Referring to FIG. 5, the spray assembly 112 is also seen as are the green tea tank 100 and the dilution tank 104. The water from the dilution tank 104 is passed through a dilution valve 114 to the dilution water spout 88 and then into the service urn.

Figure 6:
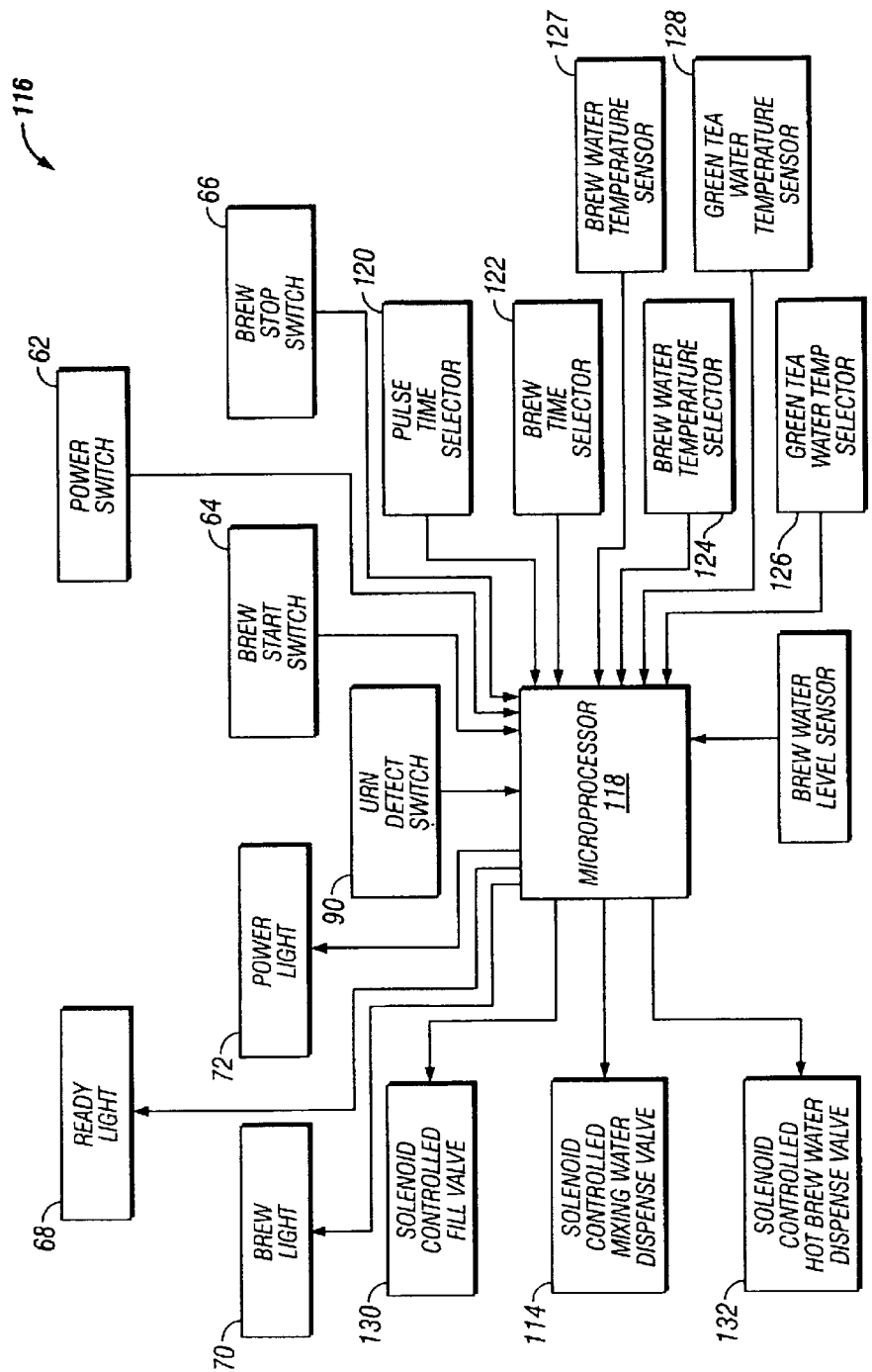
FIG. 6 is a functional block diagram of the controller.

Referring now to FIG. 6, the preferred embodiment of the control system 116 preferably employs a microprocessor 118, preferably a MOTOROLA SEMICONDUCTOR model 68HC705 P6A eight bit microprocessor. This processor is preferably used in a T2682-120 controller made by NATIONAL CONTROLS CORPORATION although other controllers could be successfully employed. In any event, the microprocessor receives switch inputs from a power switch 62, the brew stop switch 66 and the brew start switch 64 from the front control panel and the urn detection switch 90. It also receives inputs from the selectors in the back panel, the pulse time selector 120, the brew time selector 122 and the brew water temperature selector 124 and a green tea water temperature selector 126. Other inputs include inputs from a brew water temperature sensor 127 and a green tea water temperature sensor 128 and a brew water level sensor. Based on the status of the tea maker 54, the microprocessor provides output signals to control the brew light 70, the ready light 68 and the power light 72.

In response to the input signals the microprocessor 118 controls solenoid controlled valves to control the flow of water throughout the system. A solenoid controlled fill valve 130 is controlled to add new water to the hot brew water tank. A solenoid controlled hot brew water dispense valve, or brew valve, 132 is controlled to intermittently add water to the brew basket 34. The solenoid controlled mixing water, or dilution water, dispense valve, or dilution valve 114 is controlled to add dilution water to the tea extract in the urn to make ice tea.

Figure 7A:
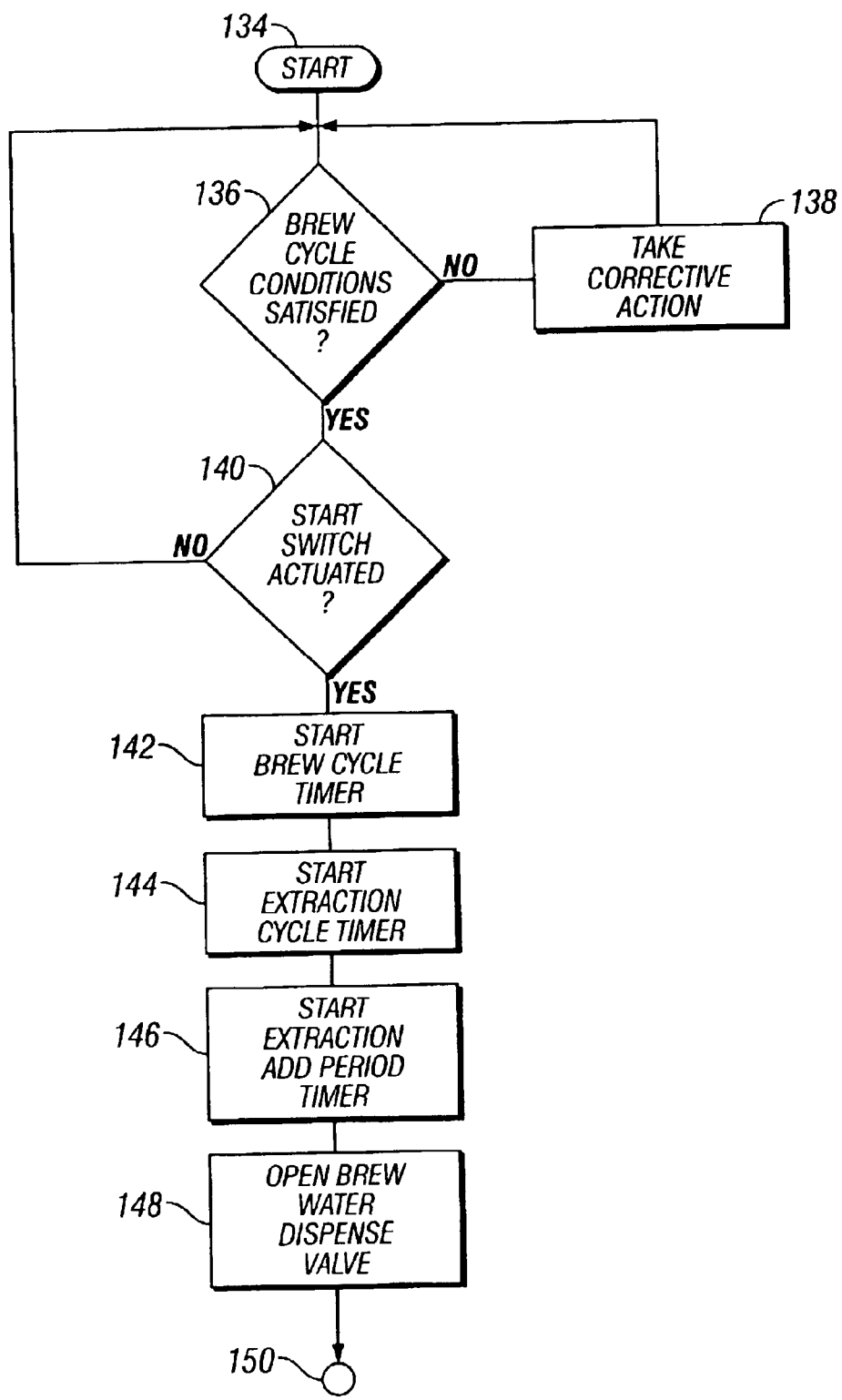
FIGS. 7A and 7B form a single composite logic flow chart for operation of operation of the tea maker with the controller of FIG. 6.
Figure 7B:
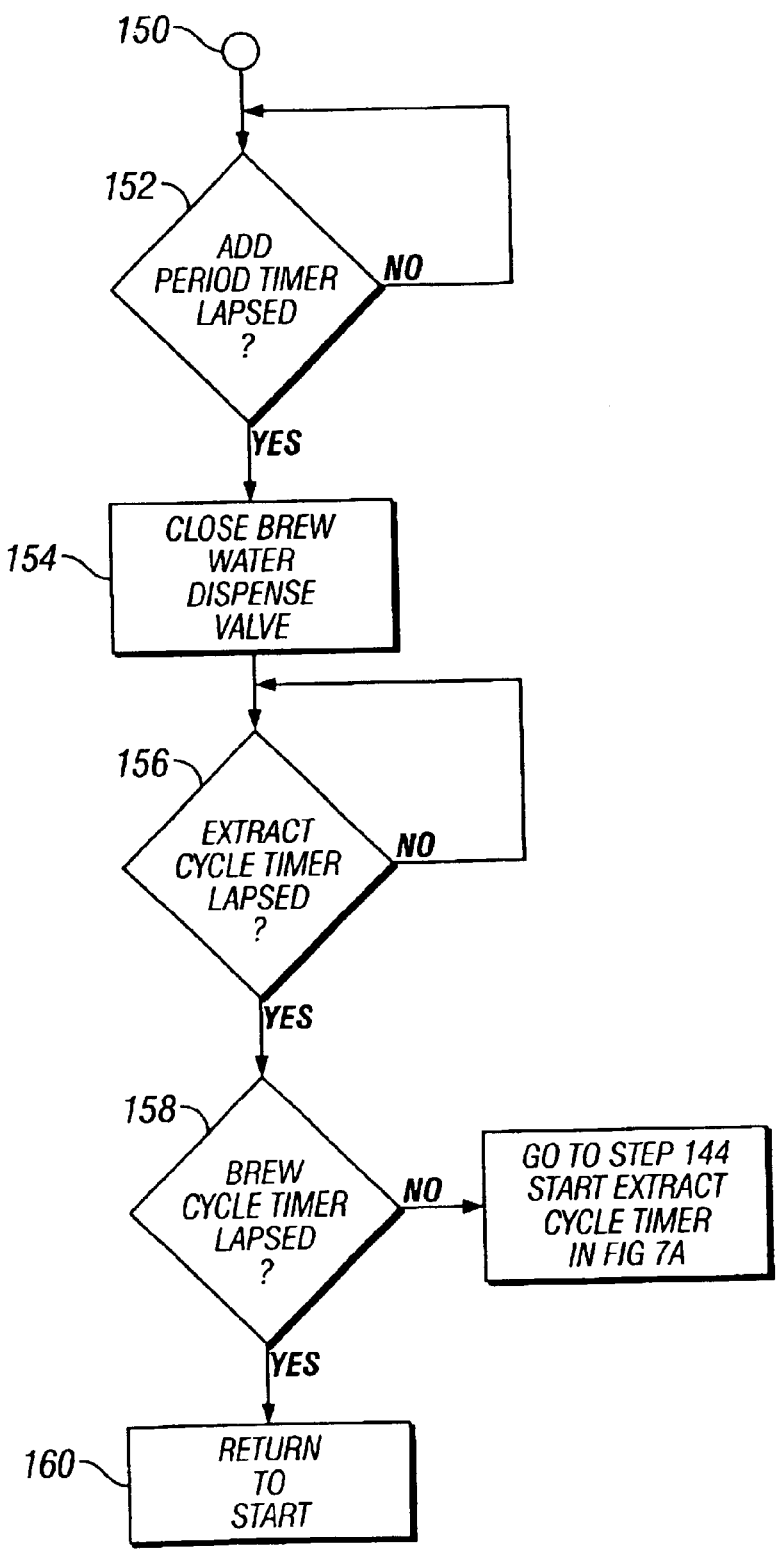

The microprocessor 118 generally operates in accordance with the flow chart of FIGS. 7A and 7B. After the start of the program in step 134, a determination is made in step 136 whether the brew cycle conditions have been satisfied. The hot brew water tank must have the preselected amount of water needed for producing the desired amount of tea abstract and it must be at the preselected temperature. The urn detection switch must detect the presence of the urn for receipt of the abstract and the dilution water. If the brew cycle conditions have not been satisfied, then corrective action is taken in step 138 until they are satisfied, such as opening the fill valve until the correct level has been reached or heating the brew water until it has reached the preselected temperature. After all the preconditions have been satisfied, the program passes to step 140 to determine if the brew switch has been activated. If the brew start switch is activated, then in step 142, a brew cycle timer is started. Also, an extraction cycle timer is started in step 144, an extraction add period timer is started in step 146. Next, in step 148, the brew water dispense valve is opened to begin adding brew water to the brew basket. The program then passes to junction 150 and is continued in FIG. 7B.

Referring to FIG. 7B, after the brew valve is opened in step 148, in step 152 a determination is made if the add period timer has lapsed. If the add period timer has lapsed then in step 154, the brew water dispense valve is closed. A determination is then made in step 156 if the extraction cycle timer has lapsed. If the extraction cycle timer has lapsed, then a determination is made whether the brew cycle timer has lapsed in step 158. If the brew cycle timer has lapsed then in step 160 the program returns to start and the process is repeated for the next brew cycle. If the brew cycle has not lapsed but the extraction cycle timer has lapsed, then in step 162 the program returns to step 144, and another extraction cycle is commenced.

The brewer in this fashion gently showers the tea leaves with hot water for several seconds during the add period, then pauses while the water drains through during a pause until the end of the extraction cycle. This on/off cycle repeats throughout the brew cycle. As previously noted, conventional tea brewers steep the tea leaves, submerging them in a bath of hot water throughout the brew cycle. The tea maker 54 of the present invention allows most of the water to drain through the tea leaves between pulse cycles. This allows oxygen to contact the tea leaves throughout the brewing process for the best flavor extraction available. The cold water dilution ratio is also different than most tea brewers. After brewing 0.75 gallons of concentrated hot tea, or tea extract, the tea maker 54 automatically adds 2.25 gallons of cold water. The result is a 1:3 ratio, the best for tea flavor extraction. Other tea brewers typically use a 1:2 ratio (one third hot/2 thirds cold).

The following is some technical data concerning the preferred embodiment of the the tea maker 54.

Brewing Specifications

Brew Volume: 3.0 gallons (11.3 liters)
Paper Filter Size: 13" × 5" Product #F002
Water Requirements: 20–75 psig, 2 gpm Factory Settings Brew time: 12 minutes
Pulse: 10 seconds on, 20 seconds off Water Temperature:
200° F. in Main Tank
175° F. Green Tea Faucet (optional)

Brew Temperature Protection: Enabled

| Brewer Weight (empty) | Water Tank Capacity | Brewer Weight (filled) | Dispenser Weight (empty) | Dispenser Capacity | Dispenser Weight (filled) | Total Weight Brewer & Dispenser Filled |
|---|---|---|---|---|---|---|
| 49 lbs. | 5.0 gal. | 90.5 lbs. | 12.0 lbs. | 3.0 gal. | 37.0 lbs. | 127.5 lbs. |
| 22.2 kg | 19 liters | 41.1 kg | 5.4 kg. | 11.3 liters. | 16.8 kg. | 58.0 kg. |

The following are some operating instructions that preferably are followed during operation of the tea maker 54. On initial startup, from dry tank conditions, the green "READY" will flash three minutes after turning unit on, indicating a fault (low water level). Turn the power switch off and back on to reset this. Repeat one additional time if necessary.

The brewer will be ready for operation as soon as the ready light comes on to signify that the water tank is up to temperature.

Depending on the cost of electricity in the users area, very little savings may be had by turning the brewer off between shifts. The water tank is well insulated and may actually use less electricity to keep the tank hot, than re-heating the tank from a cold condition. Leaving the brewer in the on position will also avoid delays at the beginning of shifts for the brewer to reach operating temperature. One dispenser (water only) should be brewed to confirm proper fill levels during start up for the first time. The brewer is preferably preset to deliver a total of 3.0 gallons to the dispenser.

Tea retains water after brewing, therefore the brew level will be reduced proportionally to the amount of tea used.

Here are some of the steps for the user to follow:

Turn brewer on/off switch to the on position. The power switch will illuminate to indicate that the brewer has power and is operating. When the ready light illuminates, the brewer is fully up to temperature. The amount of time required to gain full operating temperature will vary depending on the electrical configuration that was ordered, and the temperature of the incoming water.

Prepare the brew basket. Place a paper filter in the brew basket. Pour the appropriate amount of tea into the paper filter, and distribute it evenly. The amount of tea used will depend on your personal tastes and the recommendation of your supplier. Alternatively, place the desired number of filter bags with ground tea into the brew basket. Slide the brew basket into place.

Place the dispenser in position under the brew basket. Make sure the dispenser is empty. Overflowing may result if it is not completely empty when the brew cycle begins. Ensure that the dilution spout is inserted into the back of the dispenser. Ensure that the dispenser is pushed all the way in, so that the dispenser body is pressing the detection switch.

Optional Setting: Brew Temperature Protection. The brewer 54 is preferably set so that it cannot brew unless the water is at the proper temperature. If a brew cycle is started without the ready light on, no water will be dispensed and the brew light will begin flashing. Once the water heats to the proper temperature, the brew cycle will begin normally. Preferably this feature can be disabled.

Start the brew cycle. Start a brew cycle by pressing the start switch. The brew light will illuminate during the brew cycle. At the end of the brew cycle, the brew light will flash for 3-minutes, indicating that tea is still dripping from the brew basket and that cold water for dilution is flowing into the dispenser. The brew basket should not be removed until dripping from the bottom of the brew basket has stopped. Carefully remove the brew basket while inspecting the inside of the basket for hot tea that may have been trapped or has not finished draining. To interrupt the brew cycle at any time, press the stop switch. This will reset all functions. All settings and adjustments are made on the control board, which is accessible inside the back of the unit.

The tea maker features a system that dispenses factory calibrated amounts of hot and cold water completely before refilling the tanks. This amount of water (0.75 gallons hot, 2.25 gallons cold) is determined by the size of the tanks and the distance between the hot water level probe and the dispense tube. The water tanks will not refill until the brew cycle is finished and the dispense valves have closed.

The brew cycle time is preferably adjustable from two to twelve minutes and is preset at twelve minutes. The brew time always defaults to the nearest full minute on a selection dial.

The brew time must be set long enough to dispense the full volume of water, however, a setting that is longer than necessary will delay the next brew cycle.

The pulse feature allows the spray of water over the tea leaves to cycle on and off throughout the brew cycle. The setting is made with the add period selector. The total extraction cycle is preferably thirty seconds in length.

EXAMPLES

1.) The add period setting, 10 seconds, will give 10 seconds of spray over followed by a 20 second pause.
2.) A setting of 15 seconds will give 15 seconds of spray over followed by a 15 second pause.

The Pulse and Brew settings must be synchronized so that the dispense valve is open long enough to dispense all of the brew water, without being open longer than is necessary. The brew cycle should preferably be set as follows:

Factors in Setting Times

| On Time Setting (Pulse) | 10 sec. | 15 sec. | 20 sec. | 25 sec. | 30 sec.* |
|---|---|---|---|---|---|
| Brew Time Setting (minimum) | 12 min. | 8 min. | 6 min. | 5 min. | 4 min. |

*No pulse

Temperature

The brew water temperature is adjustable from 190° F. to 205° F. and is factory set at 200° F. The adjustment is made on the center dial of the control board. Adjustment should only be necessary at high altitudes to prevent boiling.

When a brew protection feature is enabled, a brew cycle cannot begin unless the water is at the proper temperature. If a brew cycle is started without the ready light on, no water will be dispensed and the brew light will begin flashing. Once the water heats to the proper temperature, the brew cycle will begin normally.

Thus, in accordance with the present invention a method of brewing tea in an automatic tea maker having a supply of hot brew water, a controlled valve for passing the hot brew water into a brew basket, a supply of mixing water, and a dispensing urn for receipt of tea extract and receipt of mixing water from the mixing water supply is provided comprising the steps of establishing a brew cycle, said brew cycle being composed of a plural succession of extraction cycles, each extraction cycle alternating between an intermittent add period and an intermittent pause period; opening the controlled valve during each add period to add hot water from the hot brew water sup ply to the tea at the bottom of the brew basket, and closing the controlled valve to allow the hot brew water added during the add period to drain sufficiently through the tea and out of the drain hole as tea extract to expose to atmospheric air the tea within the brew basket before the commencement of the next add period; and allowing drainage of substantially all of the tea extract during each pause period through a drain hole of sufficient size. Preferably, each of the extraction cycles has a period duration on the order of thirty seconds. Preferably the add period is on the order of approximately seven to ten seconds in duration. The method includes the steps of preselecting the duration of the add periods for a given brew cycle to be one of a period on the order of an approximately seven seconds and a period on the order of approximately ten seconds.

In accordance with the method an amount of hot water on the order of approximately 6.33–7.6 ounces of hot brew water is added to the brew basket during an add period on the order of 7–10 seconds during each intermittent add period, and the drain hole has a minimum diameter on the order of approximately 0.285 inch.

The duration of the brew cycle is on the order of approximately 5–6 minutes, the extraction cycle is approximately thirty seconds and the add period is approximately seven to ten seconds and the amount of hot brew water added to the brew basket during each add period is approximately 6.33–7.6 ounces.

More broadly, the method of the invention of making tea in an automatic tea maker having a supply of hot brew water, a controlled valve for passing the hot brew water into a brew basket, a supply of mixing water, and a dispensing urn for receipt of tea extract and receipt of mixing water from the mixing water supply, comprising the steps of placing a preselected amount of tea within the brew basket; during a brew cycle automatically passing a preselected quantity of hot brew water into the brew basket and into contact with the tea at the bottom of the brew basket at a preselected brew water passing rate; and draining tea extract from the brew basket at a preselected drain rate relative to the preselected brew water passing rate to prevent the tea from continuously steeping in its entirety in the hot water for the entire brew cycle and to thereby expose the tea to atmospheric air including oxygen during a significant portion of the brew cycle.

Preferably, the step of automatically passing includes the step of intermittently changing the relationship between the passing rate and the drain rate to allow a substantial portion of all of the tea extract to be drained from the brew basket repetitively throughout the brew cycle. The actual rate of passing during intermittent periods, when there is no pausing in the actual passing, is greater than the drain rate. The actual rate of passing during the intermittent periods when there is no pausing in the actual passing is approximately 3–4 times the drain rate. The average passing rate during the brew cycle is composed of a plurality of successive periods of different actual rates that vary substantially above and below the average rate and the drain rate is continuous. Importantly, the method includes the step of intermittently changing the relationship between the passing rate and the drain rate to allow a substantial contact of the tea with the atmospheric oxygen during the brew cycle.

While a particular tea maker has been disclosed to illustrate a preferred implementation of the method of the invention, it should be appreciate that there are other ways in which the tea may be oxygenated during the brewing process if steeping is avoided. For instance, the tea could be sprayed in an oscillating or rotating manner so that different parts are wetted at different times to allow oxygen contact with different parts of the tea at different parts of the spray cycle. Reference should be made to the claims for a full understanding of the scope of the invention.

What is claimed is:

1. A method of brewing tea in an automatic tea maker having a supply of hot brew water, a controlled valve for passing the hot brew water into a brew basket, a supply of mixing water, and a dispensing urn for receipt of tea extract from a drain hole in the brew basket and receipt of mixing water from the mixing water supply, comprising the steps of:

establishing with a timer of a controller a brew cycle, said brew cycle being composed of a plural succession of extraction cycles, each extraction cycle alternating between an intermittent add period of preselected duration and an intermittent pause period of preselected duration;

placing dry tea ingredient at the bottom of the brew basket;

opening the controlled valve during each add period to add hot water from the hot brew water supply to the tea at the bottom of the brew basket, and closing the controlled valve during each of the intermittent pause periods to allow the hot brew later added during the add period to drain sufficiently through the tea and out of the drain hole as tea extract to expose to atmospheric air the tea within the brew basket before the commencement of the next add period; and draining from the brew basket through a drain hole of sufficient size substantially all of the tea extract during each pause period.

2. The tea making method of claim 1 in which each of the extraction cycles has a period duration on the order of thirty seconds.

3. The tea making method of claim 2 in which each of the add periods is on the order of approximately seven to ten seconds in duration.

4. The tea making method of claim 1 in which each of the add periods is on the order of approximately seven to ten seconds in duration.

5. The tea making method of claim 4 including the steps of preselecting the duration of the add periods for a given brew cycle to be one of a period on the order of an approximately seven seconds and a period on the order of approximately ten seconds.

6. The tea making method of claim 1 in which an amount of hot water on the order of approximately 6.33–7.6 ounces of hot brew water is added to the brew basket during an add period on the order of 7–10 seconds during each intermittent add period, and the drain hole has a minimum diameter on the order of approximately 0.285 inch.

7. The tea making method of claim 1 in which the duration of the brew cycle is on the order of approximately 5–6 minutes.

8. The tea making method of claim 1 in which the duration of the brew cycle is approximately 5–6 minutes, the extraction cycle is approximately thirty seconds and the add period is approximately seven to ten seconds and the amount of hot brew water added to the brew basket during each add period is approximately 6.33–7.6 ounces.

9. The tea making method of claim 1 in which the drain hole has a diameter equal to approximately 0.285 inch.

10. A method of making tea in an automatic tea maker having a supply of hot brew water, a controlled valve for passing the hot brew water into a brew basket, a supply of mixing water, and a dispensing urn for receipt of tea extract and receipt of mixing water from the mixing water supply, comprising the steps of:

placing a preselected amount of tea within the brew basket;

during a brew cycle automatically passing a preselected quantity of hot brew water into the brew basket and into contact with the tea at the bottom of the brew basket at a preselected brew water passing rate; and draining tea extract from the brew basket at a preselected drain rate relative to the preselected brew water passing rate to prevent the tea from continuously steeping in its entirety in the hot water for the entire brew cycle and to thereby expose the tea to atmospheric air including oxygen during a significant portion of the brew cycle.

11. The tea making method of claim 10 in which the step of automatically passing includes the step of intermittently changing the relationship between the passing rate and the drain rate to allow a substantial portion of all of the tea extra to be drained from the brew basket repetitively throughout the brew cycle.

12. The tea making method of claim 10 in which the actual rate of passing during intermittent periods, when there is no pausing in the actual passing, is greater than the drain rate.

13. The tea making method of claim 12 in which the actual rate of passing during the intermittent periods when there is no pausing in the actual passing is approximately 3–4 times the drain rate.

14. The tea making method of claim 10 in which the average passing rate during the brew cycle is composed of a plurality of successive periods of different actual rates that vary substantially above and below the average rate and the drain rate is continuous.

15. The tea making method of claim 10 in including the step of intermittently changing the relationship between the passing rate and the drain rate to allow a substantial contact of the tea with the atmospheric oxygen during the brew cycle.

\* \* \* \* \*